Aug. 30, 1949.　　　　H. J. FREYMAN　　　　2,480,809
ELECTRICALLY HEATED STEAM RADIATOR
Filed May 5, 1945　　　　　　　　　　　　3 Sheets-Sheet 1
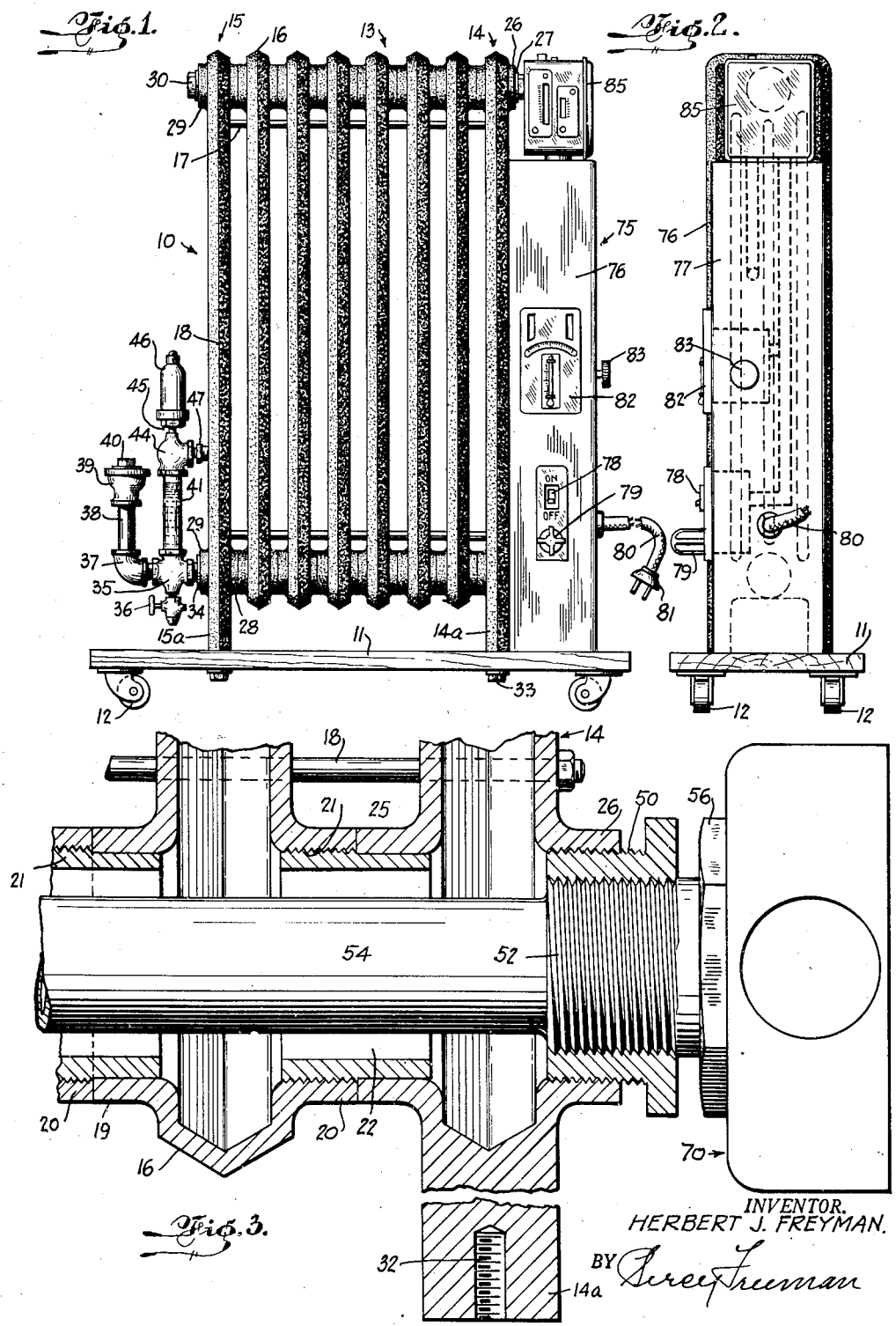
INVENTOR.
HERBERT J. FREYMAN.
BY
ATTORNEY.

Aug. 30, 1949.   H. J. FREYMAN   2,480,809
ELECTRICALLY HEATED STEAM RADIATOR
Filed May 5, 1945   3 Sheets-Sheet 2
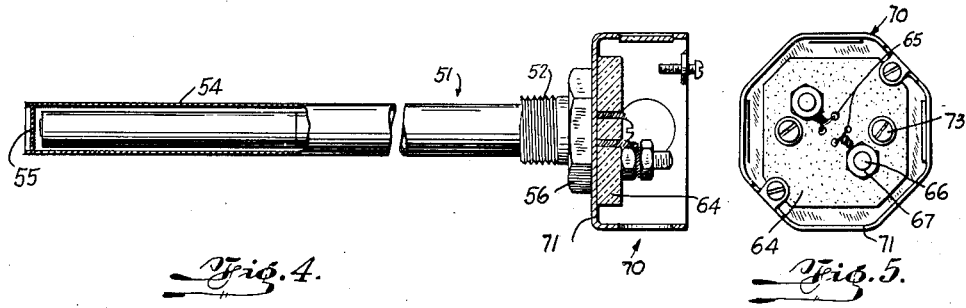
Fig. 4.   Fig. 5.
Fig. 6.
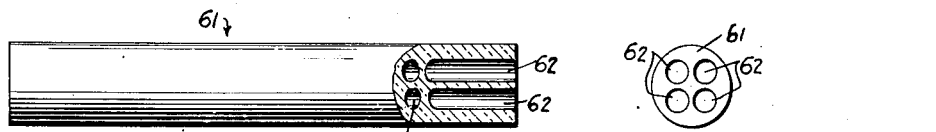
Fig. 7.   Fig. 8.
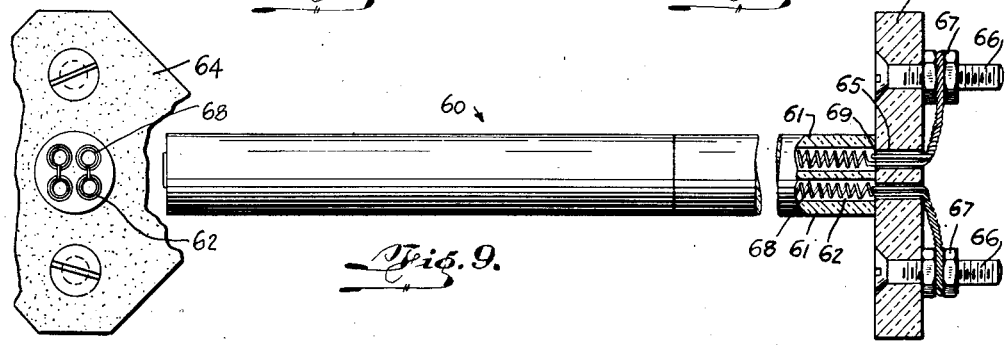
Fig. 9.
Fig. 10.
INVENTOR.
HERBERT J. FREYMAN.
BY
ATTORNEY.

Patented Aug. 30, 1949

2,480,809

UNITED STATES PATENT OFFICE 2,480,809

ELECTRICALLY HEATED STEAM RADIATOR

Herbert J. Freyman, New York, N. Y.; Jay Freyman administrator of said Herbert J. Freyman, deceased Application May 5, 1945, Serial No. 592,179

2 Claims. (Cl. 219—38)

This invention relates to electrically operated steam radiator.

An object of this invention is to provide a sectional radiator of the character described including electrical heating means therefor, said electrical heating means comprising an insulating holder for heating coils, and said holder being formed of sections which may be built up so that its length will correspond to the number of sections in the radiator.

Another object of this invention is to provide an electrically heated steam radiator provided with means to switch the electricity for the heating coil "on" and "off" at a set pressure, and which is further provided with a thermostat to switch the current for the heating coil "on" and "off" at a set temperature.

Yet a further object of this invention is to provide an electrically heated steam radiator of the character described provided with means to indicate the level of the water within the radiator, said radiator being further provided with a filling means for adding water thereto, when necessary.

Still a further object of this invention is to provide a strong, rugged and durable portable radiator of the character described which shall be relatively inexpensive to manufacture, which shall be fully automatic in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown various possible illustrative embodiments of this invention;

Fig. 1 is a front elevational view of an electrically heated portable steam radiator embodying the invention.

Fig. 2 is an end view thereof.

Fig. 3 is a partial elevational cross-sectional view through part of the radiator.

Fig. 4 is a side elevational view of the heating element with parts broken away and in cross-section.

Fig. 5 is an end view of the structure shown in Fig. 4.

Fig. 6 is an enlarged partial view of the heating element.

Fig. 7 is a top plan view of one of the sections of the wire holder with parts broken away and in cross-section.

Fig. 8 is an end view of the structure shown in Fig. 7.

Fig. 9 is a side elevational view of the heating element withdrawn from the tubular casing faucet element.

Fig. 10 is a fragmentary end view of the structure shown in Fig. 9.

Figure 11:
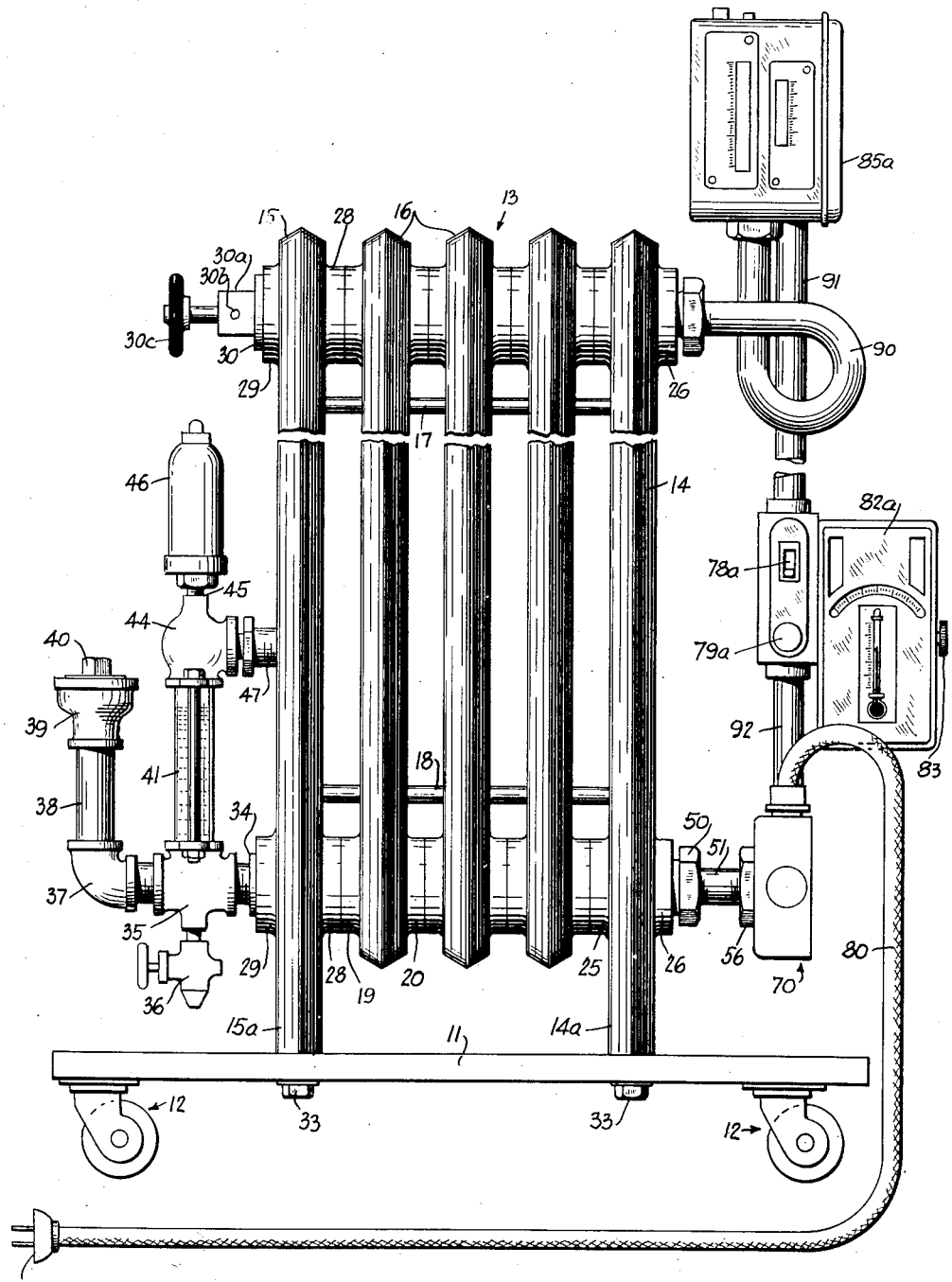
Fig. 11 is a front elevational view of a modified form of electrically heated portable steam radiator embodying the invention.

Referring now in detail to the drawing, 10 designates a portable electrically heated steam radiator embodying the invention. The same comprises a flat platform or base 11 mounted on rollers or casters 12. Mounted on the base 11 is a radiator casing 13. The same comprises end sections 14 and 15 and intermediate sections 16. The sections are assembled together by top and bottom tie bolts 17 and 18 in a well-known manner. Each of the sections 16 is formed at the top and bottom with oppositely projecting tubular flanges 19 and 20. The tubular portions 20 are formed with internal screw threads 21. Screwed to the screw-threaded openings 21 are tubes 22. Each tube 22 projects into a flange 19 of the next section.

Section 14 has flanges 25 receiving the tubes 22 of the next adjacent section 16. Said section 14 has oppositely extending tubular flanges 26 at the top and bottom. Screwed to the top flange 26 is a reducing plug 27.

The end section 15 has at the top and bottom, flanged openings 28 on one side, which contact the adjacent flanges 19 of one of the sections 16. Said end section 15 has annular flanged openings 29 extending oppositely to flanged openings 28, at the top and bottom. The upper flanged opening 29 is closed by a plug 30.

The end sections 14 and 15 are provided with legs 14a and 15a which contact the base 11. Said legs are formed with screw-threaded openings 32 to receive studs 33 which pass through suitable openings in the platform 11. The studs 33 thus serve to fix the radiator casing 13 to the platform.

Means are provided to indicate the level of water in the radiator and to add water to the radiator. To this end there is screwed to the flanged opening 29 a reducing plug 34 and connected thereto by means of a nipple is a T-fitting 35. At the bottom of the T-fitting 35 is a valved drain 36. Connected to the T-fitting by means of a nipple is an elbow 37 to which is attached a vertical nipple or pipe 38. Connected to the upper end of the nipple 38 is a filler cap 39 provided with a closure plug 40. Attached to the central portion of the T-fitting 35 is a vertical glass tube 41. At the upper end of the tube 41 is an elbow fitting 44 provided with an upwardly extending reduced opening 45. Attached to the reduced opening 45 is an air valve 46. One branch of the T-connection 44 is connected by a nipple 47 to the end section 15. Water may be entered into the radiator about once a year through the filler cap 39. The water tube 41 shows the level of the water within the radiator.

Means is provided to heat the water in the radiator. To this end there is screwed to the lower flanged opening 26 of the end section 14, a screw-threaded sleeve 50. Screwed within the sleeve 50 is a horizontal metal tube 51. The tube 51 may be made of brass and has a screw-threaded portion 52 engaging the internal threads of the sleeve 50. Extending from the screw-threaded portion 52 is a tubular portion 54 which passes through the lower ends of the sections 14 and 16, and projecting into the lower end of section 15. At the end of the tubular portion 54 is an end wall 55. At the opposite end of member 51 is an enlarged polygonal integral nut or head 56 to facilitate screwing of the tube into the sleeve 50.

Projecting into the tube 51 is a heating unit 60. Unit 60 comprises a plurality of similar rods 61 assembled in tandem. Each of the rods 61 has four through openings 62. The length of each rod 61 may be equivalent to the width of one or more of the sections of radiator. Thus the number of rods 61 employed will depend upon the number of sections in the radiator. The rods 61 are assembled with the openings 62 in registration. The rods 61 are made of heat-resisting, electrical insulating material such as porcelain. At one end of the assembled rods is a disc 64 made of similar material. Disc 64 may be square with the corners cut off. It is formed with four openings 65 adapted to register with the openings 62. Attached to the disc 64 are a pair of binding posts 66. The binding posts 66 may be in the form of screws secured to the disc and projecting therefrom. On each binding post 66 are a pair of lock nuts 67. Threaded through the openings 62 is a heating coil 68, which is in one continuous piece, threaded back and forth through the openings 62. The ends of the coil 68 are attached to the binding post 66, between the lock nuts 67. The heating coil holds the rods 61 in assembled relation.

Additional wires 69 may be twisted with the terminal portions of the coil 68 and inserted into the openings 65, such construction preventing the terminals from becoming too hot by reducing electrical resistance. The disc 64 may be mounted within an outlet box 70. The outlet box 70 has a bottom wall 71 contacting the rear surface of disc 64. The rod 61 adjacent the disc passes through an opening in the bottom wall 71. Said disc may furthermore be attached to said bottom wall by screws 73.

In the form of the invention illustrated in Figs. 1 and 2, there is mounted on the platform 11 and contacting the end section 14 a vertical casing 75. Casing 75 may have front and rear walls 76 and an end wall 77. Mounted on the front wall 76 is an "on" and "off" switch 78, which may be suitably electrically connected to the binding posts 66. The "on" and "off" switch may be in the form of a usual snap switch to turn the current for the heating coil on and off.

Also mounted on box 75 is a pilot light 79 suitably interposed in the circuit of the heating coil so as to glow when the current is "on" and to be extinguished when the current is "off."

Also connected to the circuit for the heating coil is a cable 80 provided at one end with a plug 81 for attachment to a wall socket to supply current for the heating coil.

Recessed in the box 76 is a thermostat 82, as for example, a Minneapolis-Honeywell thermostat which closes and opens the circuit to the heating element on temperature setting. The temperature at which the circuit is closed and opened may be adjusted by turning handle 83. Such thermostat is well known in the art and may be connected to the circuit for the heating element in a well-known manner.

The reducing plug 27 is provided with a reduced outlet to which is connected a pressure sensitive switch 85 such as a Minneapolis-Honeywell Pressure Trol, which cuts the current "on" and "off" at a predetermined set pressure.

In Fig. 11 a modification is shown which in all general respects is similar to the form shown in Figs. 1 and 2. However, in this form, the casing 75 is omitted and the Pressure Trol 85a is connected to the top flange 26 through the intermediary of the looped tube 90. Electrical connections between the pressure switch 85a and switch 78a are enclosed in conduit 91 and from switch 78a to outlet box 70 through conduit 92. In this modification the thermostat 82a is mounted beside switch 78a instead of above it as in the preferred form.

It will be understood that the radiator is fully automatic in every way. If the snap switch 78 or 78a is "on" the radiator is controlled by the thermostat switch 82 or 82a until the setting on the thermostat is satisfied, unless the steam pressure rises above the set safety limit, in which case the Pressure Trol switch 85 or 85a is activated to open the electric circuit. When the pressure is reduced below the safe working pressure, the switch 85 or 85a will again close the circuit. The radiator operates at low current consumption. The visible water gauge indicates when it is necessary to add water. The device is always ready for immediate use, once the proper amount of water is in the radiator. The radiator may be on a platform on rollers and can easily be moved around; however, it will be understood that the platform may be omitted if it be desired to have the radiator permanently located. It can be plugged into any electrical outlet. A pilot light 79 indicates when the radiator is in operation.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, what I claim as new and desire to secure by Letters Patent, is:

1. A sectional radiator, a heating element for the radiator comprising a plurality of rods of heat-resisting electrical insulating material having through openings, said rods being arranged end to end in axial alignment with their through openings aligned, a continuous heating coil passing back and forth through said registered openings, said heating coil being the sole means of uniting said rods, and means to attach the two ends of the heating coil to a current supply.

2. In combination, a sectional steam radiator, the sections of said radiator forming a passage extending through the radiator, a metal tube screwed to one of the sections and extending through said passage, and a heating unit within said tube, said heating unit comprising a plurality of rods in axial alignment, said rods being made of heat-resisting, electrical insulating material, and formed with registering through openings, and a continuous heating coil threaded back and forth through said openings, said heating coil being the sole means of uniting said rods, a disc at one end of an end rod, binding posts on the disc, the ends of said heating coil being attached to said binding posts.

HERBERT J. FREYMAN.

REFERENCES CITED

The following references are of record in the file of this patent:

UNITED STATES PATENTS

| Number | Name | Date |
|---|---|---|
| 1,158,723 | Ross | Nov. 2, 1915 |
| 1,355,867 | Thompson | Oct. 19, 1920 |
| 1,409,647 | Bardill | Mar. 14, 1922 |
| 1,430,706 | Wallmann | Oct. 3, 1922 |
| 1,437,119 | Speck | Nov. 28, 1922 |
| 1,462,703 | Jones | July 24, 1923 |
| 1,499,192 | Parkhurst | June 24, 1924 |
| 1,528,495 | Lennig | Mar. 3, 1925 |
| 1,619,865 | Head | Mar. 8, 1927 |
| 1,680,104 | Head | Aug. 7, 1928 |
| 1,909,593 | Parsons | May 16, 1933 |
| 1,945,139 | Du Chemin | Jan. 30, 1934 |